United States Patent
Sen et al.

(10) Patent No.: US 9,544,758 B2
(45) Date of Patent: Jan. 10, 2017

(54) BASEBAND CACHING OF SIM FILES

(71) Applicant: Apple Inc., Cupertino, CA (US)

(72) Inventors: Abhishek Sen, San Jose, CA (US); Bharath Narasimha Rao, Sunnyvale, CA (US); Prashant H. Vashi, Sunnyvale, CA (US); Vikram B. Yerrabommanahalli, Sunnyvale, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/501,573

(22) Filed: Sep. 30, 2014

(65) Prior Publication Data

US 2015/0133196 A1    May 14, 2015

Related U.S. Application Data

(60) Provisional application No. 61/903,131, filed on Nov. 12, 2013.

(51) Int. Cl.
*H04W 8/18* (2009.01)
(52) U.S. Cl.
CPC .................... *H04W 8/183* (2013.01)
(58) Field of Classification Search
CPC .................................................... H04W 8/183
See application file for complete search history.

(56) References Cited

U.S. PATENT DOCUMENTS

| | | | |
|---|---|---|---|
| 8,406,761 B2 | 3/2013 | Murray et al. | |
| 2005/0153741 A1* | 7/2005 | Chen et al. | 455/558 |
| 2006/0116169 A1 | 6/2006 | Park | |
| 2010/0091719 A1* | 4/2010 | Deshpande et al. | 370/329 |
| 2012/0322503 A1* | 12/2012 | Liu et al. | 455/558 |
| 2013/0029726 A1* | 1/2013 | Berionne et al. | 455/558 |
| 2014/0057679 A1* | 2/2014 | Berionne | H04W 8/205 455/558 |
| 2014/0274028 A1* | 9/2014 | Breed | H04W 12/00 455/423 |

* cited by examiner

*Primary Examiner* — Brandon Miller
(74) *Attorney, Agent, or Firm* — Meyertons Hood Kivlin Kowert & Goetzel, P.C.; Jeffrey C. Hood (57) ABSTRACT

This disclosure relates to caching SIM files at a baseband processor to reduce cellular bootup time. According to one embodiment, a wireless device may read SIM files from a SIM and store a local copy of each file in a cache of the baseband processor of the wireless device. SIM identification information for the SIM from which the cached files were read may be associated with the cache. Indicator information usable for comparing file versions may also be generated and stored in the cache for each file. Upon a subsequent SIM initialization, the wireless device may read SIM files from the cache instead of from the initialized SIM if the cached version is identical to the SIM version, which may be determined based at least in part on the SIM identification information and the indicator information for such files.

20 Claims, 8 Drawing Sheets

BASEBAND CACHING OF SIM FILES

PRIORITY CLAIM

The present application claims benefit of priority to U.S. Provisional Application No. 61/903,131 titled "Baseband Caching of SIM Files" and filed on Nov. 12, 2013, which is hereby incorporated by reference in its entirety as though fully and completely set forth herein.

FIELD

The present disclosure relates to wireless devices, and more particularly to a system and method for reducing the time to camp on cellular bootup based on caching SIM files and/or files having SIM file dependencies at a baseband processor of a wireless device.

DESCRIPTION OF THE RELATED ART

Wireless communication systems are rapidly growing in usage. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless devices which use cellular communication technologies are frequently equipped with subscriber identity modules (SIMs), which may include various subscriber identity and/or device provisioning information which may be used to configure the wireless device for cellular communication.

SUMMARY

Embodiments are presented herein of, inter alia, methods for caching SIM files and/or files having SIM file dependencies on a baseband processor of a wireless device, and of devices configured to implement the methods.

According to the techniques described herein, a wireless device may read SIM files from a SIM and store a local copy of each file in a cache of the baseband processor of the wireless device. The wireless device may also associate SIM identification information for the SIM from which the cached files were read with the cache. Additionally, indicator information usable for comparing file versions may be generated and stored in the cache for each file.

Upon a subsequent SIM initialization, the wireless device may request certain information from the initialized SIM in order to determine whether valid locally cached versions of any files needed for cellular bootup are available. For example, the wireless device may compare SIM identification information to determine whether the initialized SIM is the same as that associated with the cache. If not, the cached SIM files may not be valid for the SIM initialization and any needed files may be read from the SIM.

If the initialized SIM is the same as that associated with the cache, the wireless device may further compare indicator information for locally cached SIM files with SIM files from the initialized SIM. If the SIM files have not been updated by the SIM since they were cached by the wireless device, they may still be valid. In this case, the wireless device may read any such SIM files from their cached versions rather than from the SIM. This may substantially reduce cellular bootup time, at least in some instances, for example if reading from a local cache takes less time than reading from the SIM.

Such techniques may also be applied to files having dependencies on SIM files, if desired. For example, a file which the wireless device generates based on certain SIM files may be stored in the cache. If, upon SIM initialization, it is determined that locally cached copies of all of the SIM files based upon which the file is generated are valid, it may also be determined that the locally cached version of the file generated based on those SIM files is also valid. In this case, the wireless device may be able to avoid generating the file anew and instead read the locally cached version, potentially further increasing time savings for cellular bootup.

The techniques described herein may be implemented in and/or used with a number of different types of devices, including but not limited to cellular phones, tablets, portable media players, wearable devices, and various other types of computers and computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
SIM: Subscriber Identity Module
eSIM: Embedded SIM
UICC: Universal Integrated Circuit Card
eUICC: Embedded UICC
IMSI: International Mobile Subscriber Identity
OTA: Over-The-Air
MMSS: Multimode System Selection
MLPL: MMSS Location Associated Priority List
MSPL: MMSS System Priority List
HLR: Home Location Register
PLMN: Public Land Mobile Network
HPLMN: Home PLMN
OPLMN: Operator PLMN (or Operator Controlled PLMN)
PRL: Preferred Roaming List
EPRL: Enhanced PRL
RAT: Radio Access Technology

TERMS

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element— includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
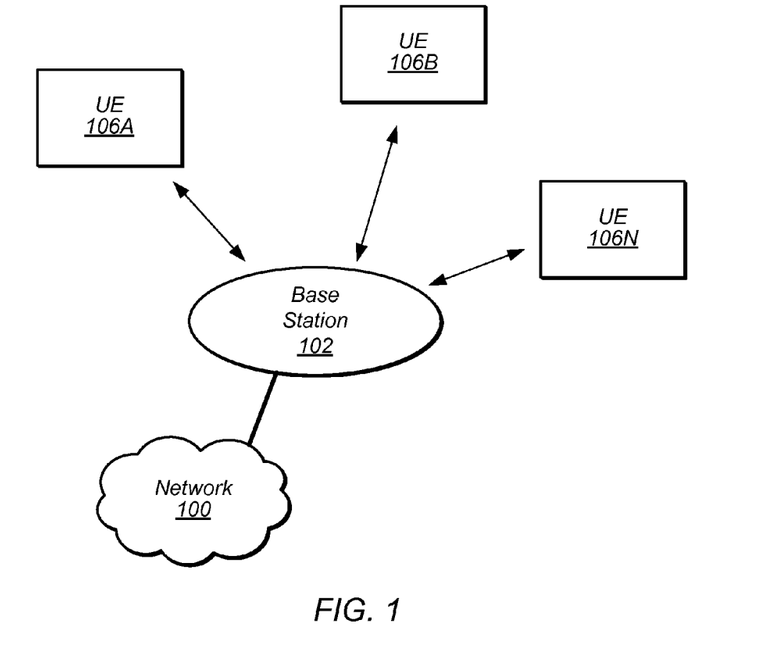
FIG. 1 illustrates an exemplary (and simplified) wireless communication system, according to one embodiment.
Figure 2:
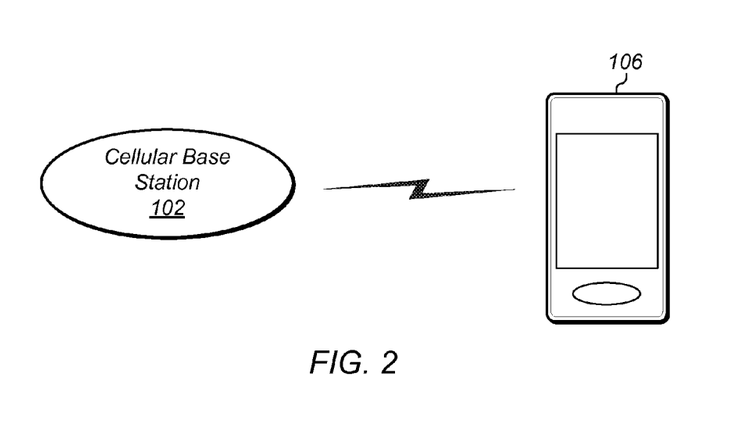
FIG. 2 illustrates a base station (BS) in communication with a user equipment (UE) device, according to one embodiment.

FIGS. 1-2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells, which may be referred to as "neighboring cells". Such cells may also be capable of facilitating communication between user devices and/or between user devices and the network 100, according to the same wireless communication technology as base station 102 and/or any of various other possible wireless communication technologies. Such cells may include "macro" cells, "micro" cells, "pico" cells, and/or cells which provide any of various other granularities of service area size.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102, according to one embodiment. The UE 106 may be a device with wireless network connectivity such as a mobile phone, a hand-held device, a wearable device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
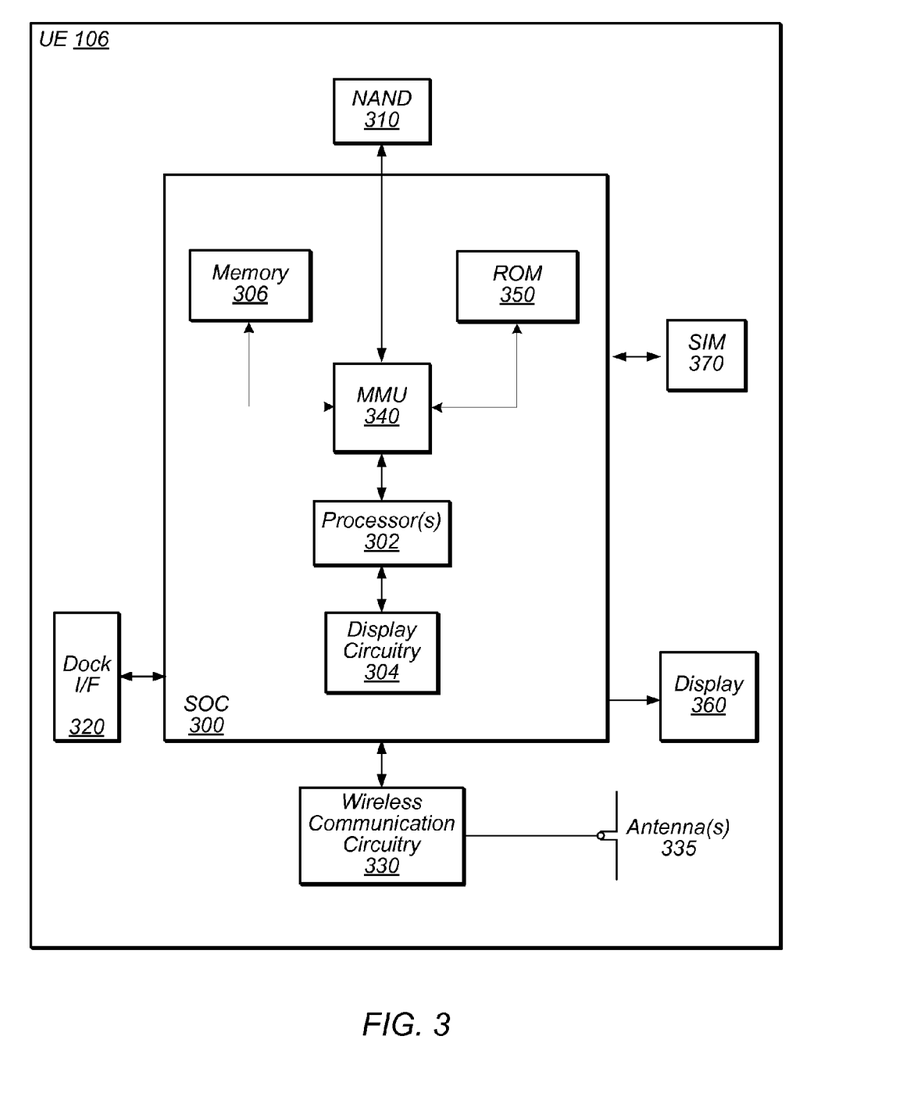
FIG. 3 illustrates an exemplary block diagram of a UE device, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication. As noted above, the UE 106 may be configured to communicate wirelessly using multiple wireless communication technologies in some embodiments.

As shown, the UE 106 may include a SIM (Subscriber Identity Module) 370. The SIM 370 may be implemented as an application on a smart card, in some embodiments. The smart card may itself be referred to as a SIM card in some cases. As one example, the SIM 370 may be an application which executes on a Universal Integrated Circuit Card (UICC). The smart card may also include (e.g., store and/or execute) one or more other applications, if desired. The smart card may be removable.

Alternatively, the SIM 370 may be implemented as an embedded SIM (eSIM). In this case, the SIM 370 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306) executing on a processor (such as processor 302) in the UE 106.

The SIM 370 may include a number of types of information, potentially including personalized information specific to a user and/or device and/or information that is common to multiple users and/or devices (e.g., of a particular cellular service provider). Some examples of information which may be included on the SIM 370 may include an International Mobile Subscriber Identity (IMSI) number which identifies the subscriber to their carrier's network; a preferred roaming list (PRL) and/or one or more public land mobile network (PLMN) files (e.g., for use in network search and selection); one or more multimode related files such as multimode system priority list (MSPL) and/or a multimode location associated priority list (MLPL). Any of a variety of other information may also or alternatively be stored on the SIM 370, as desired.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for caching and/or utilizing cached SIM files and/or files having SIM dependencies, such as those described herein with reference to, inter alia, FIGS. 5-8. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 5-8.

Figure 4:
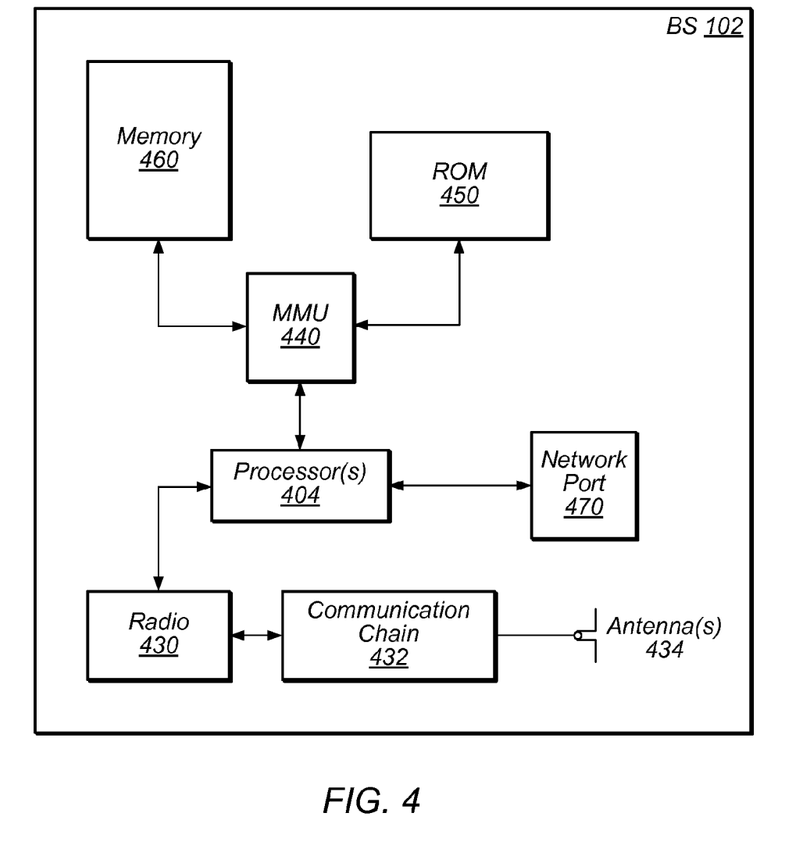
FIG. 4 illustrates an exemplary block diagram of a BS, according to one embodiment.

FIG. 4—Exemplary Block Diagram of a Base Station

FIG. 4 illustrates an exemplary block diagram of a cellular base station (BS) 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to support the use of cached SIM files and/or files having SIM dependencies by a UE 106 in conjunction with cellular communication services. For example, the BS 102 may include hardware and software components capable of use in conjunction with a UE 106 implementing some or all of the features described herein with reference to, inter alia, FIGS. 5-8.

The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIGS. 5-8—Flowcharts

Upon booting up (e.g., as a result of powering on, SIM refresh or update, or a SIM swap) of cellular capabilities of a cellular device (such as might be exemplified by the UE 106 illustrated in and described with respect to FIGS. 1-3), the cellular device may typically rely on information stored on its SIM (i.e., a SIM coupled to or comprised in the cellular device) to access a cellular network. For example, SIM information may be used by the device as part of the cellular communication protocol(s) being used by the device for cellular communication, and/or for configuration purposes.

The information stored on the SIM which is used for cellular boot up may include any of a variety of information, which may take any of a variety of formats. As possible examples, some 3GPP devices might rely on home public land mobile network (HPLMN) and/or operator controlled PLMN (OPLMN) files as part of device bootup, e.g., in order to determine network(s) to search for and/or select (e.g., to camp on) to provide cellular connectivity, while some 3GPP2 devices may rely on a preferred roaming list (PRL) or enhanced PRL (EPRL). Additionally, some multimode capable devices may rely on both 3GPP and 3GPP2 related information stored on the SIM, possibly in addition to supplementary multimode information, such as multimode system priority list (MSPL) and/or multimode location associated priority list (MLPL) files, stored on the SIM. Any such files used for cellular bootup may typically be read from the SIM as part of the cellular bootup process.

Furthermore, in some cases as part of cellular initialization/bootup a cellular device may generate additional information based on one or more SIM files. For example, some multimode devices may generate a multimode preferred roaming list based on 3GPP, 3GPP2, and multimode SIM files, and use the multimode PRL as part of performing network search/selection and eventually camping on a cell of a selected network.

In practice, it may be the case that reading files from the SIM as part of bootup may form a considerable portion of the total time to achieve cellular connectivity. As one example, reading SIM files might take 1-1.5 s out of an approximate 10-15 s total time to cellular connectivity, or approximately 10%. Note that numerous other SIM file reading times (e.g., 0.2 s, 0.5 s, 2 s, etc), total times to cellular connectivity (e.g., 5 s, 8 s, 20 s, 30 s, etc.), and proportions of SIM file reading time to total time to cellular connectivity (e.g., 5%, 15%, etc.) are also possible, e.g., depending on implementation details, variable real-world conditions, and/or any of various other possible considerations.

Also in practice, it may be the case that the information stored on the SIM and used during bootup may not change very frequently. In many cases, the SIM files relied upon for achieving cellular connectivity may change only when the SIM is changed (e.g., swapped for another physical SIM) or updated (e.g., over the air).

Typically, a cellular device may employ a baseband processor in combination with other wireless communication circuitry to perform cellular communication. In many cases, such a baseband processor may include local/cache memory to which it may have faster (possibly much faster) access than to SIM files.

Accordingly, it may be possible to reduce the time it takes for a device to achieve cellular connectivity upon bootup (e.g., the time to camp) on some or possibly most occasions by storing (caching) copies of SIM files which are used during bootup, and/or files generated based on SIM files, in a local memory of the baseband processor itself. As long as the original SIM files on which the cached files are based remain the same, utilizing those cached files for device bootup instead of the SIM files themselves may significantly reduce the time to camp for a cellular device while providing equivalent functionality. In case the underlying SIM files have been updated, the device may also be provided with means for detecting that the locally cached copies are out-of-date, in order to avoid using incorrect/out-of-date information to attempt to achieve cellular connectivity.

Figure 5:
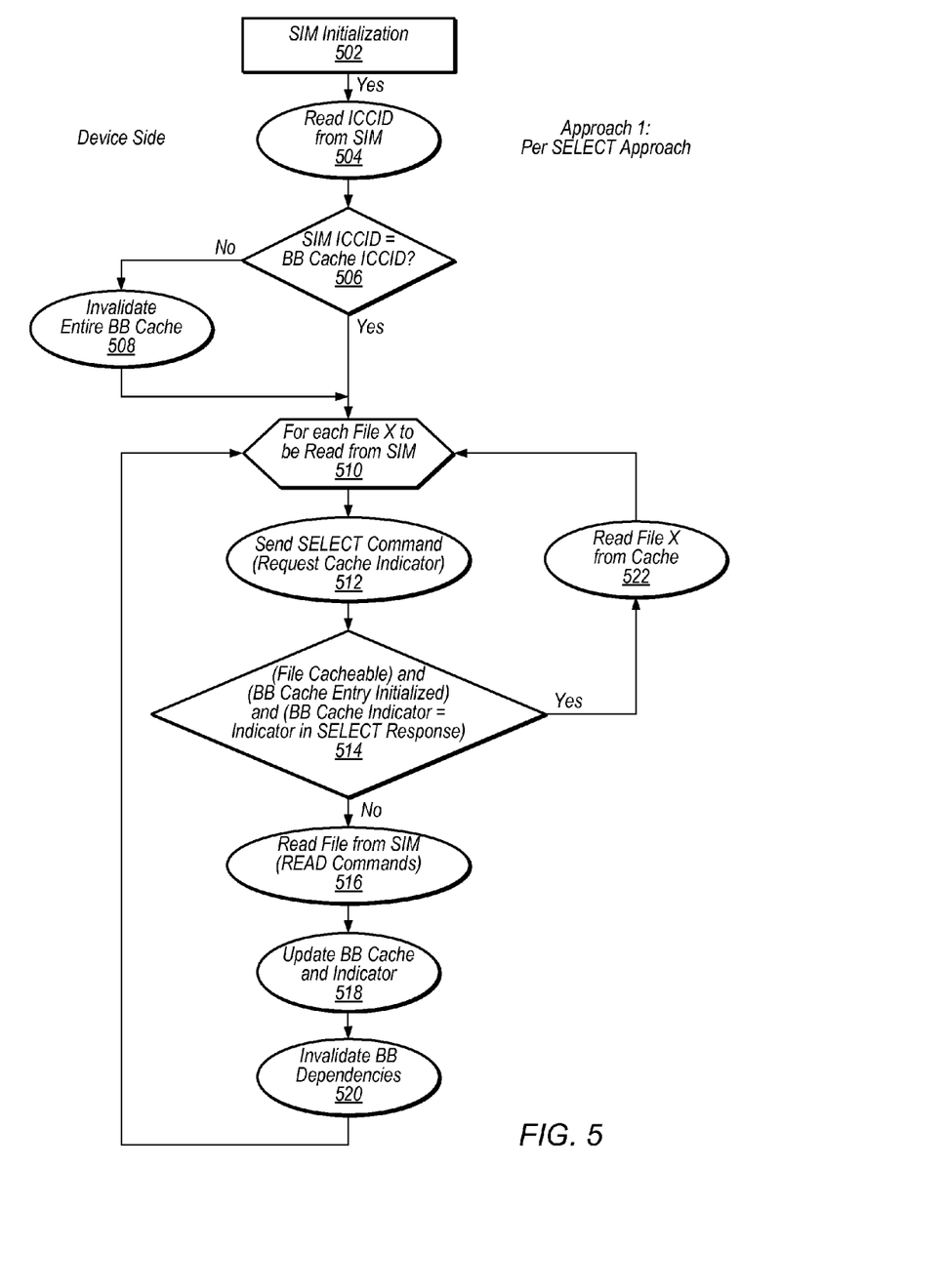
FIGS. 5-8 are flowchart diagrams illustrating aspects of techniques for utilizing cached versions of SIM files and/or files having SIM dependencies as part of operation of a UE, according to one embodiment.
Figure 6:
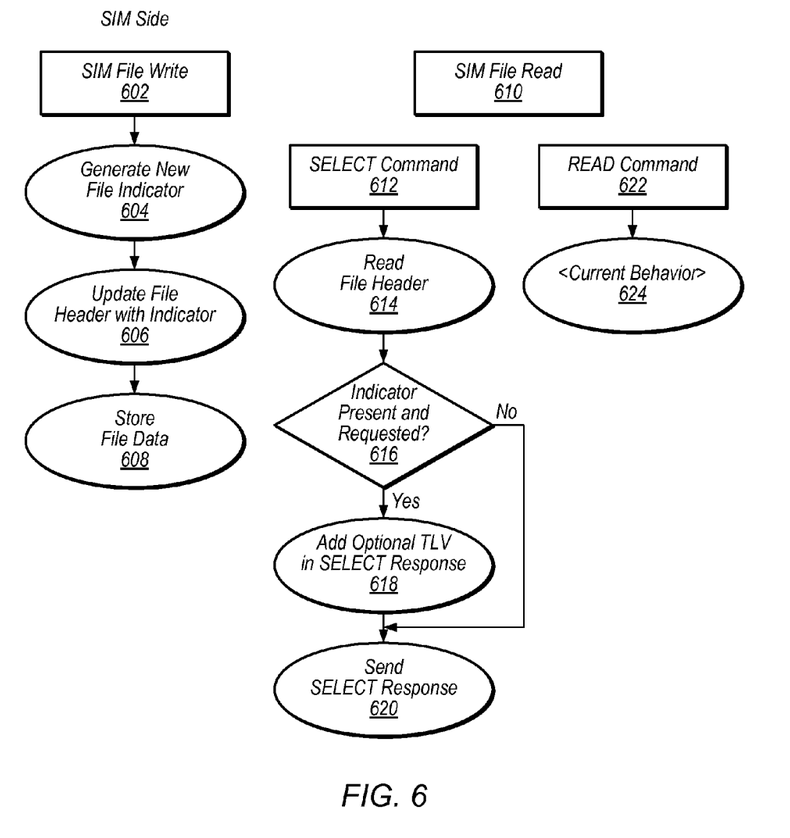
Figure 7:
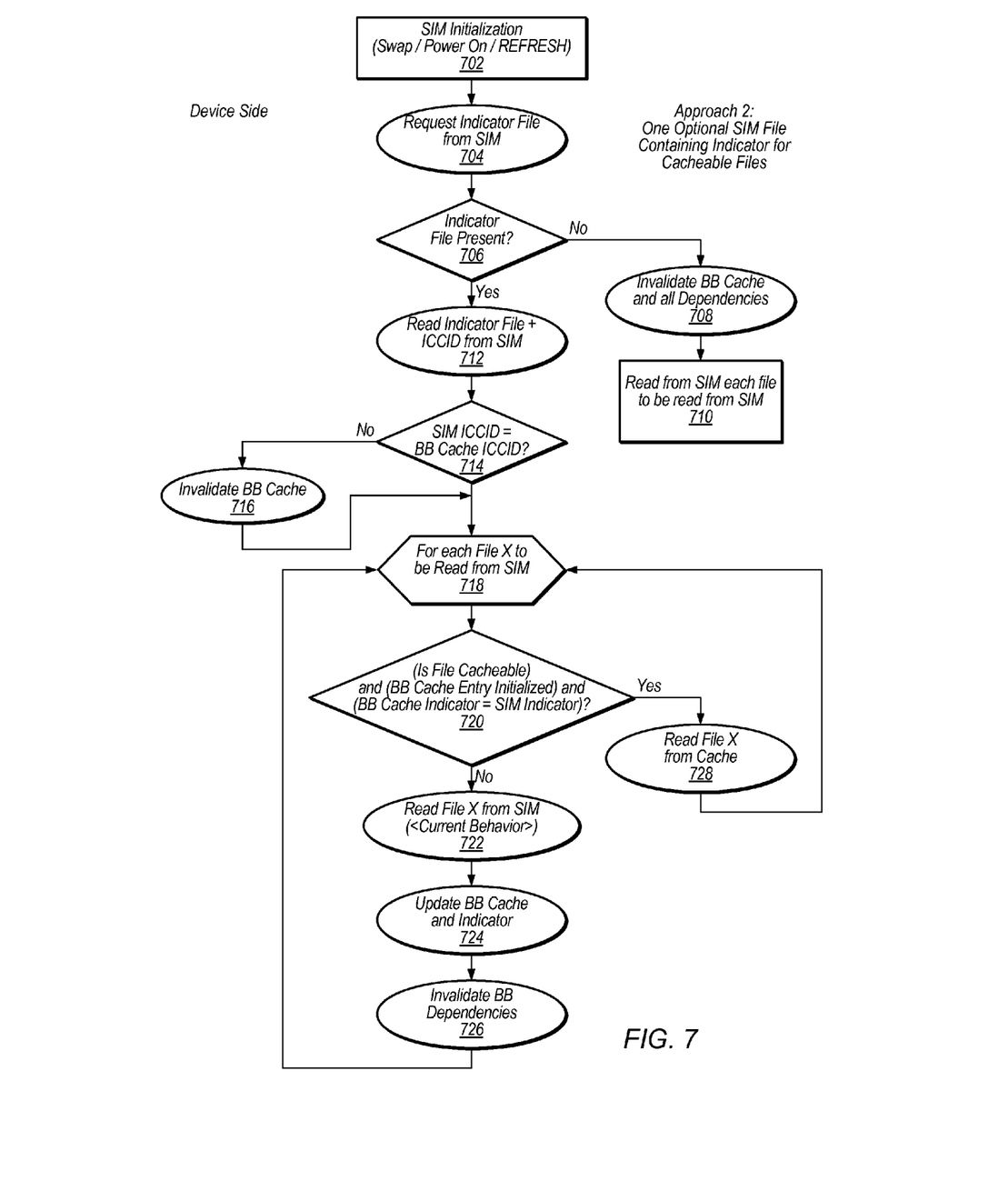
Figure 8:
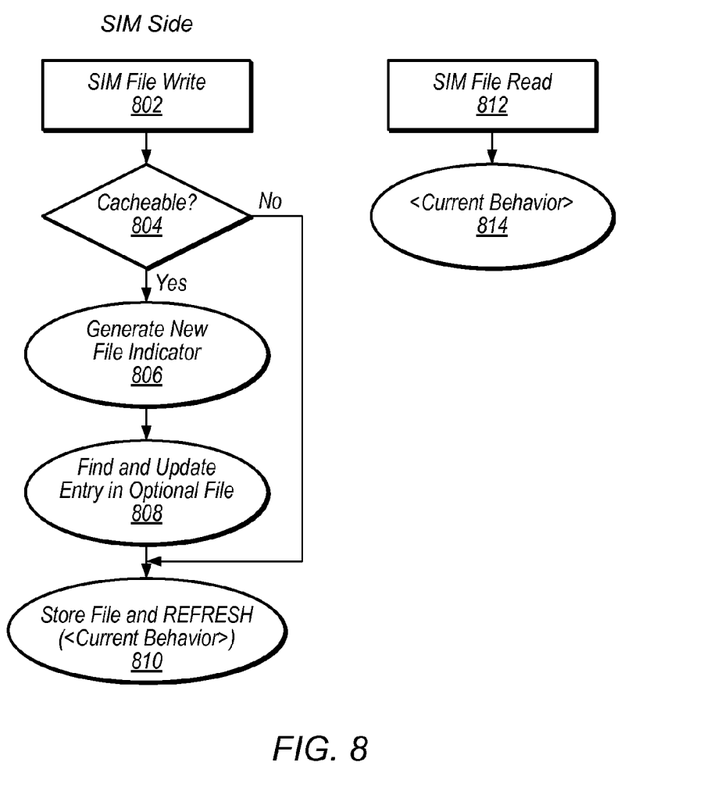

FIGS. 5-8 are flowchart diagrams illustrating various methods which may be used to achieve such time savings. In particular, FIG. 5 illustrates a method for a cellular device to utilize cached files upon cellular bootup to reduce the time to achieve cellular connectivity, and FIG. 6 illustrates a corresponding method for a SIM device (e.g., a SIM card) to support such use of files cached at baseband, in which file indicators which may be used to validate baseband cached copies of SIM files are included in the associated SIM files themselves. FIG. 7 illustrates an alternate method for a cellular device to utilize cached files upon cellular bootup to reduce the time to achieve cellular connectivity, and FIG. 8 illustrates a corresponding method for a SIM device (e.g., a SIM card) to support such use of files cached at baseband, in which indicators which may be used to validate baseband cached copies of SIM files are included in a separate SIM file.

The methods shown in FIGS. 5-8 may be used in conjunction with any of the computer systems or devices shown in the above Figures, among other devices. Some of the method elements shown may be performed concurrently, in a different order than shown, or may be omitted. Additional method elements may also be performed as desired. As shown, the methods may operate as follows.

In 502, the SIM may be initialized. Note that, at least in some instances, the SIM may be a separate (discrete) device from the cellular device, having its own memory element(s) and/or processing element(s). For example, as described with respect to FIG. 3, the SIM may be implemented on a removable smart card coupled to (e.g., inserted into) the cellular device. In other instances, as alternatively described with respect to FIG. 3, the SIM may be implemented on hardware which is embedded in the cellular device (e.g., an embedded smart card); for example, the SIM may be an eSIM which may be pre-provisioned or provisioned over-the-air, and/or may be updated over-the-air.

In 504, a SIM identifier, such as an integrated circuit card identifier (ICCID), may be read from the SIM. The SIM identifier may provide identification information for the SIM which may be usable by the cellular device to determine whether the SIM being initialized is the same SIM as may have been previously used in conjunction with the cellular device.

In 506, it may be determined whether the SIM identifier matches a SIM identifier stored in the cache of a baseband processor of the cellular device. A SIM identifier stored in (and/or associated with) the baseband cache may be a SIM identifier of a SIM which was initialized in a previous (e.g., recent) cellular bootup operation. Note that in some cases, a cellular device may be configured to/capable of creating and maintaining local file caches for multiple SIMs. This may be beneficial in instances in which multiple SIMs are frequently used with the cellular device. For example, a user who frequently travels might possess a SIM for each of multiple locations (e.g., countries, regions, etc.) in which that user wishes to use their cellular device. As another example, some cellular devices may be capable of utilizing multiple SIMs; for example, Dual SIM Dual Subscription or Dual SIM Dual Active systems may include multiple SIMs.

If the currently initialized SIM matches a SIM for which a baseband cache was created, the SIM identifier of the SIM may match a SIM identifier stored in the baseband cache. However, if the SIM has been changed (e.g., if one SIM card has been swapped out for another SIM card, or possibly if the SIM has been re-provisioned) to a SIM for which the cellular device has not created (or has created and since deleted) a baseband cache, the SIM identifier of the SIM may not match a SIM identifier stored in the baseband cache.

In such a case, any SIM files stored in the baseband cache may not be valid for the current cellular bootup (e.g., may not be faithful to corresponding files/file types on the currently initialized SIM). Thus, in 508, if the SIM identifier of the SIM does not match a SIM identifier stored in the baseband cache, the entire baseband cache of SIM files may be invalidated for the current cellular bootup. If the cellular device is configured to store just one local cache for a SIM, the invalidated baseband cache of SIM files may be deleted, marked as invalid, overwritten, etc., among various possibilities. If the cellular device is capable of creating and maintaining local caches for multiple SIMs, any previously cached SIM files associated with other SIMs may simply be ignored for the current cellular bootup. In addition (e.g., in anticipation of building a new baseband cache of SIM files), the SIM identifier associated with the currently initialized SIM may be stored in and/or associated with a baseband cache.

If the SIM identifier of the SIM does match a SIM identifier stored in the baseband cache, however, it may be possible that some or all baseband cached SIM files may be valid and usable in place of corresponding SIM files. Thus, proceeding from step 508 or from step 506 to step 510, a subprocess may be performed for each file to be read from the SIM. For explanatory purposes, the steps of subprocess 510 are described hereinbelow as being performed with respect to an arbitrary file "X" which may be representative of any of various files/file types stored on the SIM initialized in step 502. It will be recognized that in practice, the subprocess 510 may be performed for one or more of any number of files on the SIM, such as an EPRL, an MLPL, an MSPL, and/or any number of other files. The subprocess may include steps 512, 514, 516, 518, 520, and 522; note however that it may be the case that not all of these steps may be performed for each file to be read (e.g., only a subset of the steps may be performed for any given file).

In 512, the cellular device may send a SELECT command to the SIM, which may function as a request for a file indicator for the file X. For example, the SELECT command may include a flag for requesting a file indicator to (or to not) be part of the SELECT response. Alternatively, a file indicator may be explicitly or implicitly requested for every SELECT command; in such a case, the presence (or absence) of a file indicator as part of a SELECT response may be determined by the SIM, e.g., according to its implementation/support for that file.

Note that the file indicator may be any of a variety of types of indicators usable (e.g., by comparison with other file indicators) to determine whether or not certain files are identical. A file indicator may, at least in some instances, be substantially shorter than a file with which it is associated. As one example, a fingerprint such as a cyclic redundancy check (CRC) or hash may be used as an indicator. A date/timestamp could be another indicator. A file ID and/or file size may also be used as an indicator (or a portion thereof). Other possible indicators may include an update counter (e.g., a counter that is incremented each time a file is updated) or a random number selected by the SIM when a file is updated. In some instances, the indicator may include multiple types of information (e.g., file ID, file size, and hash fingerprint, as one example). Note that while the above examples represent several types of indicators which may be used, any number of other types of indicators may also be used alternatively or in addition. The device may receive the file indicator for the file X from the SIM in response to the SELECT command.

In 514, the file indicator received from the SIM may be compared to a file indicator for a cached version of the file X (e.g., a cached file of the same file type as file X), if the baseband cache includes a cached version of file X. The comparison may determine whether the cached version of the file X should be considered valid or not. For example, the comparison may determine whether the cached version of the file X is or is not identical to the corresponding file stored on the SIM, based on whether or not the corresponding file indicators are identical; if the cached version of file X is not identical to its 'reference' file, it may be invalid.

Note that in some cases, baseband cached SIM files may be grouped into separate applications and/or directories, e.g., in a similar manner as they may have been grouped on the SIM. For example, a baseband cache for a SIM which includes a USIM application and a CSIM application may include a USIM directory (in which SIM files from the USIM application of the SIM may be stored) and a CSIM directory (in which SIM files from the CSIM application of the SIM may be stored). At least in some instances, this may reduce lookup time (e.g., to determine whether or not there is baseband caching support) for a given file. Alternatively, all SIM files associated with a particular SIM may be grouped together regardless of application/directory distinctions made by the SIM, if desired.

Note additionally that, as implied above, in some instances the baseband cache may not include a cached version of file X. For example, the first time a cellular device is used, it may not have cached versions of any SIM files, since it may not yet have read any SIM files. As another example, if it is detected (e.g., as previously described in step 506) that the cellular device's SIM has been swapped out, updated, or otherwise changed such that the SIM identifier of the currently initialized SIM is different than the SIM identifier associated with the baseband cache, the entire baseband cache may have been deleted (e.g., as previously described in step 508) and/or a new baseband cache may have been created for the new SIM.

If the operation of step 514 results in a determination that there is not a valid cached version of the file X in the baseband cache, the method may proceed to step 516. In 516, the file X may be read from the SIM. For example, the cellular device may send a READ command corresponding to file X to the SIM, and may in turn receive the file X from the SIM.

Proceeding to step 518, the cellular device may then update the baseband cache to include the version of the file X just read from the SIM, as well as the file indicator corresponding to the file X.

Additionally, at least in some instances, in 520 any cached baseband files having dependencies upon the file X (e.g., files which are/were generated at least in part based on the file X) may be invalidated. This may force the UE to regenerate any such files, which may be desirable since such files may have been generated based upon a (e.g., old/previously cached) version of the file X which was determined (e.g., according to the comparison performed in step 514) to not be valid.

Considering again step 514, if the comparison of file indicators for the cached and SIM versions of the file X results in a determination that there is a valid cached version of the file X in the baseband cache, the method may proceed to step 522. In 522, the file X may be read from the baseband cache.

Note that, at least in some instances, reading the file X from the baseband cache may be a significantly faster operation than reading the file X from the SIM. Further, since in practice it may be relatively uncommon for SIM files to change (e.g., SIM swaps and updates may be relatively infrequent events), in many instances it may be the case that a UE is able to read SIM files used upon device bootup from the baseband cache rather than the SIM itself more often than not, possibly much more often. This may in turn result in a sufficiently faster bootup (e.g., both on those occasions on which SIM files are read from the baseband cache, and on average over all occasions) as to be noticeable by a user of the UE, and may represent an improvement in the user experience.

As noted above, FIG. 6 is a flowchart diagram illustrating techniques for a SIM to support the use of the method of FIG. 5 by a cellular device. As shown in FIG. 6, the SIM may perform various steps for each of multiple operations, including writing/updating SIM files, and reading SIM files.

In order to provide a cellular device with the ability to cache SIM files in a local baseband cache, as part of a SIM file write operation 602, a SIM may generate a new file indicator for the file being written in 604. In 606, a file header of the file being written may be updated with the file indicator just generated. In 608, the file data itself may be stored (written/updated).

Because SIM files may include file indicator information as part of (e.g., in a file header of) the SIM files themselves according to the method of FIG. 6, SIM file reading operations 610 may be decomposed into two separate sub-operations: a select operation 612 and a read operation 622.

The select operation 612 (i.e., responding to a SIM file SELECT command) may provide a cellular device sending the SELECT command with a file indicator for the SIM file selected.

More particularly, in response to receiving a SIM file SELECT command, in 614 the SIM may read a file header for the requested SIM file. In 616, it may be determined whether or not a file indicator associated with the requested SIM file is present. If there is a file indicator present in the requested SIM file, in 618 the file indicator may be included in the SIM's response to the SELECT command (e.g., as an optional tag-length-value (TLV)), and in 620 the SELECT response may be sent. However, if there is no file indicator present in the SIM file (e.g., if the requested SIM file is considered/designated a non-cacheable file), the operation may proceed from step 616 to step 620 to send a select response which does not include a file indicator for the requested SIM file. In such a case the SELECT response may or may not include an explicit indication that there is no file indicator for the selected SIM file, as desired.

The read operation 622 (i.e., responding to a SIM file READ command) may provide a cellular device sending the READ command with the contents of the requested SIM file. Note that since provision of the file indicator (if present) to the cellular device may be handled by the SIM as part of the SELECT command response, the SIM's read operation 622 may correspond to current SIM behavior 624 in response to a SIM file READ command.

As previously noted, the methods of FIGS. 7-8 may differ from the methods of FIGS. 5-6 insofar as in the methods of FIGS. 7-8 the SIM may generate, store, and maintain a SIM file for the particular purpose of storing file indicators for cacheable files, and the cellular device may be configured to utilize such a SIM file.

In 702, the SIM may be initialized.

In 704, an indicator file may be requested from the SIM. The indicator file may be a file in which file indicators for some or all cacheable SIM files stored on the SIM are stored.

In 706, it may be determined whether or not the SIM includes an indicator file. If it is determined that no indicator file is present, in 708, any/all SIM files and/or files which were generated based at least in part (e.g., having dependencies upon) one or more SIM files which are cached at the baseband processor may be invalidated. Proceeding then to step 710, the cellular device may read from the SIM each file to be read from the SIM. In other words, because in such a situation file indicator information may be unavailable, there may be no way of confirming the validity of any baseband-cached SIM files, so the cellular device may be forced to assume the invalidity of any baseband-cached SIM files and read any SIM files needed for cellular bootup from the SIM itself.

If it is determined that an indicator file is present, however, the method may proceed from step 706 to step 712, at which the indicator file and a SIM identifier may be read from the SIM. Much as described with respect to FIG. 5, the SIM identifier may provide identification information for the SIM which may be usable by the cellular device to determine whether the SIM being initialized is the same SIM as may have been previously used in conjunction with the cellular device.

Proceeding to 714, it may be determined whether the SIM identifier matches a SIM identifier stored in the cache of a baseband processor of the cellular device. A SIM identifier stored in (and/or associated with) the baseband cache may be a SIM identifier of a SIM which was initialized in a previous (e.g., recent) cellular bootup operation. As also noted with respect to FIG. 5, in some cases, the cellular device may be configured to/capable of creating and maintaining local file caches for multiple SIMs.

If the currently initialized SIM matches a SIM for which a baseband cache was created, the SIM identifier of the SIM may match a SIM identifier stored in the baseband cache. However, if the SIM has been changed (e.g., if one SIM card has been swapped out for another SIM card, or possibly if the SIM has been re-provisioned) to a SIM for which the cellular device has not created (or has created and since deleted) a baseband cache, the SIM identifier of the SIM may not match a SIM identifier stored in the baseband cache.

Again, in such a case, any SIM files stored in the baseband cache may not be valid for the current cellular bootup (e.g., may not be faithful to corresponding files/file types on the currently initialized SIM). Thus, in 716, if the SIM identifier of the SIM does not match a SIM identifier stored in the baseband cache, the entire baseband cache of SIM files may be invalidated for the current cellular bootup. If the cellular device is configured to store just one local cache for a SIM, the invalidated baseband cache of SIM files may be deleted, marked as invalid, overwritten, etc., among various possibilities. If the cellular device is capable of creating and maintaining local caches for multiple SIMs, any previously cached SIM files associated with other SIMs may simply be ignored for the current cellular bootup. In addition (e.g., in anticipation of building a new baseband cache of SIM files), the SIM identifier associated with the currently initialized SIM may be stored in and/or associated with a baseband cache.

If the SIM identifier of the SIM does match a SIM identifier stored in the baseband cache, however, it may be possible that some or all baseband cached SIM files may be valid and usable in place of corresponding SIM files. Thus, proceeding from step 714 or from step 716 to step 718, a subprocess may be performed for each file to be read from the SIM. As similarly used with respect to FIG. 5, for explanatory purposes, the steps of subprocess 718 are described hereinbelow as being performed with respect to an arbitrary file "X" which may be representative of any of various files/file types stored on the SIM initialized in step 702. It will be recognized that in practice, the subprocess 718 may be performed for one or more of any number of files on the SIM, such as an EPRL, an MLPL, an MSPL, and/or any number of other files. The subprocess may include steps 720, 722, 724, 726, and 728; note however that it may be the case that not all of these steps may be performed for each file to be read (e.g., only a subset of the steps may be performed for any given file).

In 720, if the file X is considered a cacheable type of file, and if there is a baseband cached version of the file X (e.g., a cached file of the same file type as file X), a file indicator received from the SIM (e.g., in the indicator file read in step 712) may be compared to a file indicator for a cached version of the file X. As previously described, the file indicator may be any of a variety of types of indicators usable (e.g., by comparison with other file indicators) to determine whether or not certain files are identical. Note that, as similarly described with respect to the method of FIG. 5, in some cases, baseband cached SIM files may be grouped into separate applications and/or directories, e.g., in a similar manner as they may have been grouped on the SIM; alternatively, baseband cached SIM files for a given SIM may all be grouped together, if desired.

The comparison may determine whether the cached version of the file X should be considered valid or not. For example, the comparison may determine whether the cached version of the file X is or is not identical to the corresponding file stored on the SIM, based on whether or not the corresponding file indicators are identical; if the cached version of file X is not identical to its 'reference' file, it may be considered invalid.

If the operation of step 720 results in a determination that there is not a valid cached version of the file X in the baseband cache (e.g., if the file X is not cacheable, or if there is not a baseband cached version of the file X, or if the comparison indicates that the cached version of the file X is invalid), the method may proceed to step 722. In 722, the file X may be read from the SIM. For example, the cellular device may send a READ command corresponding to file X to the SIM, and may in turn receive the contents of the file X from the SIM.

Proceeding from step 722 to step 724, the cellular device may then update the baseband cache to include the version of the file X just read from the SIM, as well as the file indicator corresponding to the file X.

Additionally, at least in some instances, in 726 any cached baseband files having dependencies upon the file X (e.g., files which are/were generated at least in part based on the file X) may be invalidated. This may force the UE to regenerate any such files, which may be desirable since such files may have been generated based upon a (e.g., old/previously cached) version of the file X which was determined (e.g., according to the comparison performed in step 720) to not be valid.

Considering again step 720, if the comparison of file indicators for the cached and SIM versions of the file X results in a determination that there is a valid cached version of the file X in the baseband cache, the method may proceed to step 728. In 728, the file X may be read from the baseband cache.

As noted above, FIG. 8 is a flowchart diagram illustrating techniques for a SIM to support the use of the method of FIG. 7 by a cellular device. As illustrated, the SIM may perform various steps for each of multiple operations, including writing/updating SIM files, and reading SIM files.

The SIM file write operation 802 may include, in step 804, determining whether or not the file to be written is considered cacheable. If it is determined to be cacheable, in 806, the SIM may generate a new file indicator for the file being written. In 808, an entry in the indicator file corresponding to the file being written may be found and updated (e.g., replaced or modified) with the newly generated file indicator. In 810, the file data itself may be stored (written/updated). Note that if in 804 it is determined that the file being written is not cacheable, the method may proceed directly to step 810 (i.e., skipping steps 806-808) without generating or storing a file indicator for the file being written.

The SIM file read operation 812 (which may include responding to a SIM file SELECT command and/or a SIM file READ command) may provide a cellular device initiating the read operation 812 with information corresponding to the requested SIM file and/or the contents of the requested SIM file. Note that because file indicators may be stored separately from their associated SIM files, the SIM's read operation 812 may correspond to current SIM behavior 814 in response to a SIM file SELECT or READ command.

Figure 9:
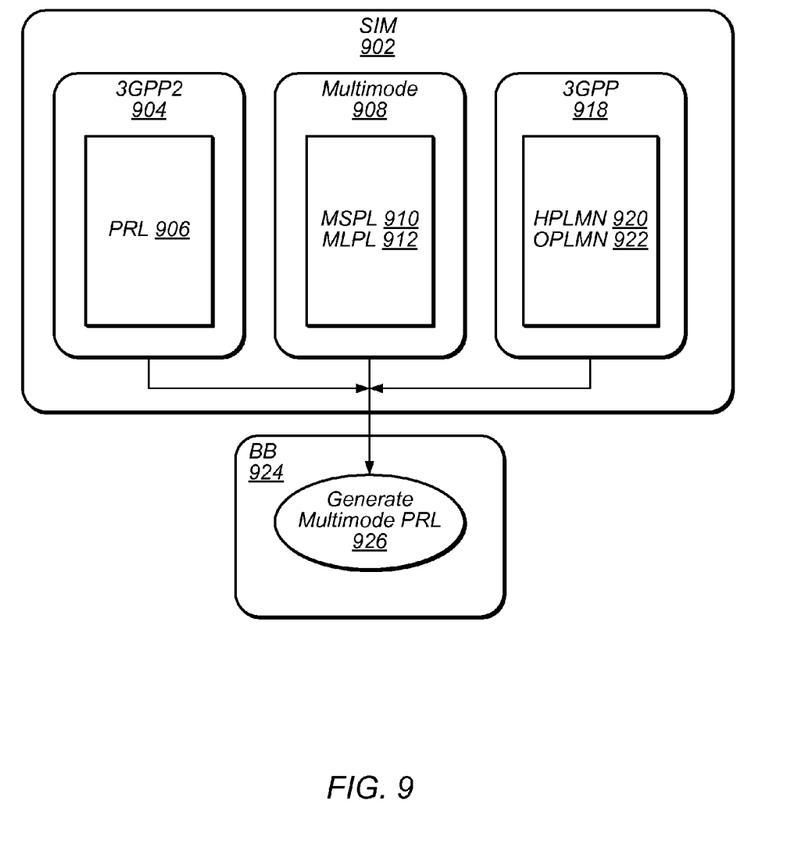
FIG. 9 is a diagram illustrating an exemplary set of SIM file dependencies for an exemplary multimode preferred roaming list file, according to one embodiment.

FIG. 9—File having SIM File Dependencies

FIG. 9 illustrates an exemplary file which may be used as part of cellular bootup, and which, though it may not have a corresponding file type stored on a SIM, is nevertheless generated based on multiple SIM files. Such a file may also be referred to herein as a file having dependency (or dependencies) upon one or more SIM files. In the exemplary scenario of FIG. 9, the file having dependencies upon SIM files may be a multimode PRL. However, it should be noted that the exemplary scenario illustrated in FIG. 9, and the associated description provided hereinbelow, are provided by way of example only, and are not intended to be limiting to the disclosure as a whole. Numerous alternatives to and variations of the details thereof are possible and should be considered within the scope of the present disclosure.

As shown, the SIM 902 may include certain sets of SIM files. The SIM 902 may, for example, include 3GPP2 associated files 904, multimode files 908, and 3GPP files 918. The 3GPP2 files 904 may include a PRL 906. The multimode files 908 may include a MSPL 910 and a MLPL 912. The 3GPP files 918 may include a HPLMN 920 and an OPLMN 922. The SIM 902 may additionally (or alternatively) include any number of other files, if desired.

The baseband processor 924 may typically request certain SIM files from the SIM in order to, in step 926, generate a multimode PRL, e.g., since the multimode PRL may be generated based on those certain SIM files. For example, in some instances, a multimode PRL may be generated based on the PRL 906, the MSPL 910, the MLPL 912, the HPLMN 920, and the OPLMN 922.

Generating the multimode PRL may take a considerable amount of time, in some instances even more than typically used to read the SIM file dependences of the multimode PRL. Thus, in addition to simply caching the SIM files upon which the multimode PRL is generated and any other SIM files used during cellular bootup, it may reduce the time to cellular bootup even further to cache the multimode PRL (and/or any other files having dependencies upon SIM files) itself at the baseband processor 924, once it has been generated. In this way, such a cached version may be used at subsequent cellular bootups, e.g., as long as it may be determined that the file dependencies of the cached multimode PRL are valid.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a radio; and
a processing element operably coupled to the radio;
wherein the radio and the processing element are configured to:
  initialize a subscriber identity module (SIM);
  request indicator information for a first file stored on the SIM;
  receive the indicator information for the first file from the SIM;
  compare the indicator information for the first file on the SIM with indicator information of a corresponding first file stored in a cache of the UE;
  determine validity status for a second file stored in the cache of the UE that is dependent on the first file on the SIM, wherein determining the validity status for the second file is based on comparing the indicator information of the first file on the SIM with the indicator information of the corresponding first file stored in the cache of the UE;
  read the second file from the cache if the second file is determined to be valid; and
  generate and store a new version of the second file in the cache of the UE if the second file is determined to be invalid.

2. The UE of claim 1, wherein the radio and the processing element are further configured to:
  request indicator information for a third file stored on the SIM;
  receive the indicator information for the third file from the SIM;
  compare the indicator information for the third file on the SIM with indicator information of a corresponding third file stored in the cache of the UE;
  wherein the second file is also dependent on the third file on the SIM, and wherein said determining the validity status for the second file is also based on comparing the indicator information of the third file on the SIM with the indicator information of the corresponding third file stored in the cache of the UE.

3. The UE of claim 2, wherein the first file on the SIM comprises a preferred roaming list (PRL) associated with a first radio access technology (RAT), wherein the third file on the SIM comprises a PRL associated with a second RAT, and wherein the second file comprises a multimode PRL that is based on the first file on the SIM and the third file on the SIM.

4. The UE of claim 1, wherein said comparing the indicator information for the first file on the SIM with the indicator information of the corresponding first file stored in the cache of the UE determines whether the first file on the SIM and the corresponding first file stored in the cache of the UE are identical, and wherein the radio and the processing element are further configured to:
  read the corresponding first file from the cache if the first file on the SIM and the corresponding first file in the cache are identical; and
  if the first file on the SIM and the corresponding first file in the cache are not identical, perform one or more of;
  read the first file from the SIM; and
  update the corresponding first file in the cache based on the first file from the SIM.

5. The UE of claim 1, wherein the indicator information for the first file on the SIM comprises one or more of:
a date and/or time stamp;
a fingerprint;
a file identifier;
a file size; or
an version update counter.

6. The UE of claim 1, wherein the first file on the SIM comprises one or more of:
a preferred roaming list (PRL);
a public land mobile network (PLMN) file;
a multimode system priority list (MSPL); or
a multimode location associated priority list (MLPL).

7. The UE of claim 1, wherein the indicator information for the first file on the SIM is stored as part of the first file.

8. An apparatus, comprising:
one or more processing elements, wherein the one or more processing elements are configured to:
initialize a subscriber identity module (SIM) of a user equipment (UE);
request indicator information for a first file stored on the SIM;
receive the indicator information for the first file from the SIM;
compare the indicator information for the first file on the SIM with indicator information of a corresponding first file stored in a cache of the UE;
determine validity status for a second file stored in the cache of the UE that is dependent on the first file on the SIM, wherein determining the validity status for the second file is based on comparing the indicator information of the first file on the SIM with the indicator information of the corresponding first file stored in the cache of the UE;
read the second file from the cache if the second file is determined to be valid; and
generate and store a new version of the second file in the cache of the UE if the second file is determined to be invalid.

9. The apparatus of claim 8, wherein the one or more processing elements are further configured to:
request indicator information for a third file stored on the SIM;
receive the indicator information for the third file from the SIM;
compare the indicator information for the third file on the SIM with indicator information of a corresponding third file stored in the cache of the UE;
wherein the second file is also dependent on the third file on the SIM, and wherein said determining the validity status for the second file is also based on comparing the indicator information of the third file on the SIM with the indicator information of the corresponding third file stored in the cache of the UE.

10. The apparatus of claim 9, wherein the first file on the SIM comprises a preferred roaming list (PRL) associated with a first radio access technology (RAT), wherein the third file on the SIM comprises a PRL associated with a second RAT, and wherein the second file comprises a multimode PRL that is based on the first file on the SIM and the third file on the SIM.

11. The apparatus of claim 8, wherein said comparing the indicator information for the first file on the SIM with the indicator information of the corresponding first file stored in the cache of the UE determines whether the first file on the SIM and the corresponding first file stored in the cache of the UE are identical, and wherein the one or more processing elements are further configured to:
read the corresponding first file from the cache if the first file on the SIM and the corresponding first file in the cache are identical; and
if the first file on the SIM and the corresponding first file in the cache are not identical, perform one or more of;
read the first file from the SIM; and
update the corresponding first file in the cache based on the first file from the SIM.

12. The apparatus of claim 8, wherein the indicator information for the first file on the SIM comprises one or more of:
a date and/or time stamp;
a fingerprint;
a file identifier;
a file size; or
an version update counter.

13. The apparatus of claim 8, wherein the first file on the SIM comprises one or more of:
a preferred roaming list (PRL);
a public land mobile network (PLMN) file;
a multimode system priority list (MSPL); or
a multimode location associated priority list (MLPL).

14. The apparatus of claim 8, wherein the indicator information for the first file on the SIM is stored as part of the first file on the SIM.

15. A method for a wireless user equipment (UE) device, the method comprising:
by the UE:
initializing a subscriber identity module (SIM);
requesting indicator information for a first file stored on the SIM;
receiving the indicator information for the first file from the SIM;
comparing the indicator information for the first file on the SIM with indicator information of a corresponding first file stored in a cache of the UE;
determining validity status for a second file stored in the cache of the UE that is dependent on the first file on the SIM, wherein determining the validity status for the second file is based on comparing the indicator information of the first file on the SIM with the indicator information of the corresponding first file stored in the cache of the UE;
reading the second file from the cache if the second file is determined to be valid; and
generating and store a new version of the second file in the cache of the UE if the second file is determined to be invalid.

16. The method of claim 15, further comprising:
requesting indicator information for a third file stored on the SIM;
receiving the indicator information for the third file from the SIM;
comparing the indicator information for the third file on the SIM with indicator information of a corresponding third file stored in the cache of the UE;
wherein the second file is also dependent on the third file on the SIM, and wherein said determining the validity status for the second file is also based on comparing the indicator information of the third file on the SIM with the indicator information of the corresponding third file stored in the cache of the UE.

17. The method of claim 16, wherein the first file on the SIM comprises a preferred roaming list (PRL) associated with a first radio access technology (RAT), wherein the third file on the SIM comprises a PRL associated with a second RAT, and wherein the second file comprises a multimode PRL that is based on the first file on the SIM and the third file on the SIM.

18. The method of claim 15, wherein said comparing the indicator information for the first file on the SIM with the indicator information of the corresponding first file stored in the cache of the UE determines whether the first file on the SIM and the corresponding first file stored in the cache of the UE are identical, and wherein the method further comprises:
- reading the corresponding first file from the cache if the first file on the SIM and the corresponding first file in the cache are identical; and
- if the first file on the SIM and the corresponding first file in the cache are not identical, perform one or more of;
- reading the first file from the SIM; and
- updating the corresponding first file in the cache based on the first file from the SIM.

19. The method of claim 15, wherein the indicator information for the first file on the SIM comprises one or more of:
- a date and/or time stamp;
- a fingerprint;
- a file identifier;
- a file size; or
- an version update counter.

20. The method of claim 15, wherein the first file on the SIM comprises one or more of:
- a preferred roaming list (PRL);
- a public land mobile network (PLMN) file;
- a multimode system priority list (MSPL); or
- a multimode location associated priority list (MLPL).

* * * * *